3,472,860
PRODUCTION OF 3,4-LUTIDINE

Kenneth Raymond Hargrave, Kirkella, England, assignor to BP Chemicals (U.K.) Limited, London, England, a British company
No Drawing. Continuation-in-part of application Ser. No. 283,719, May 28, 1963, which is a continuation-in-part of application Ser. No. 38,425, June 24, 1960. This application Sept. 15, 1967, Ser. No. 668,223
Claims priority, application Great Britain, July 4, 1959, 23,042/59
Int. Cl. C07d 31/20
U.S. Cl. 260—290                            2 Claims

ABSTRACT OF THE DISCLOSURE

A process is provided for producing 3,4-lutidine. The process comprises heating in the vapor phase a mixture of crotonaldehyde, propionaldehyde and ammonia at a temperature of 300 to 500° C. in the presence of a catalyst comprising silica-alumina.

SPECIFICATION

The present application is a continuation-in-part of application Ser. No. 283,719, filed May 28, 1963, now abandoned, which application is a continuation-in-part of the following applications:

Ser. No. 38,425, filed June 24, 1960 (now abandoned);
Ser. No. 63,485, filed Oct. 19, 1960 (now abandoned);
Ser. No. 149,197, filed Nov. 1, 1961 (now abandoned);
Ser. No. 149,198, filed Nov. 1, 1961 (now abandoned);
Ser. No. 169,611, filed Jan. 29, 1962 (now abandoned);
Ser. No. 169,614, filed Jan. 29, 1962 (now abandoned).

It has previously been reported that pyridine may be produced by the reaction of acrolein, acetaldehyde and ammonia in the vapor phase at 300° C. over an alumina catalyst. The yield of pyridine obtained was 2.5% of the theoretical (Chichibabin and Oparina, J. Prakt. Chem., vol. 107, page 154, 1924). On the basis of this work, Chichibabin suggested that the reaction of mixtures of saturated aldehydes with unsaturated aldehydes lead to two new types of condensation reactions which he formulated as follows:

(1) 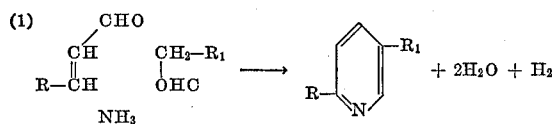

and (2) 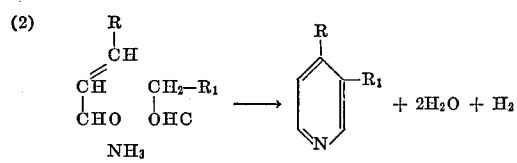

(J. Prakt. Chem., vol. 107, pages 25–6, 1924).

The reaction scheme of Chichibabin only partially accounts for the products of the reaction. Thus, crotonaldehyde, propionaldehyde, and ammonia in the reaction produce 3,4-lutidine as major reaction product which is in accordance with the second of the schemes of Chichibabin quoted above. Reaction scheme (1) as suggested by Chichibabin does not appear to illustrate a reaction which occurs to any significant extent.

The present invention is a process for producing 3,4-lutidine which comprises heating in the vapor phase a mixture of crotonaldehyde, propionaldehyde and ammonia at a temperature of 300 to 500° C. in the presence of a catalysts comprising silica-alumina which contains not more than 50% nor less than 5% by weight of alumina and not more than 95% nor less than 50% by weight of silica.

The process may conveniently be carried out by heating a mixture of the vapors of crotonaldehyde, propionaldehyde and ammonia for example by forming a mixture of crotonaldehyde vapor and propionaldehyde vapor, maintaining this mixture at the reaction temperature and adding ammonia vapor preferably heated to the same temperature, to the mixture.

The mixture of crotonaldehyde, propionaldehyde and ammonia is heated at a temperature from 300° to 500° C., a temperature from 375° to 450° C. being preferred.

Instead of using crotonaldehyde or propionaldehyde as reactant in the process, substances producing crotonaldehyde or propionaldehyde, or both, under the process conditions, may be used.

The process is preferably carried out at a space velocity of from 350 to 1,250 reciprocal hours. Within this range of space velocities, the molar ratio of ammonia to total crotonaldehyde and propionaldehyde present is preferably from 0.5:1 to 2.5:1, a ratio from 1.0:1 to 1.2:1 being particularly preferred. Within these preferred ranges of space velocity and molar ratio of reactants, a substantially equimolar ratio of crotonaldehyde to propionaldehyde present is preferred.

The process of the present invention may be carried out with particular advantage employing a catalyst which comprises silica-alumina containing a catalyst modifier, which may be zinc, cadmium, tin, lead, tungsten, nickel, cobalt, chromium, molybdenum, iron, copper, manganese, palladium, silver, or a compound of any of these metals which is stable and solid under the reaction conditions, e.g., an oxide or a fluoride thereof. Such a catalyst modifier may suitably be present in an amount up to 10% by weight of the total catalyst; two or more modifiers may be present if desired.

Accordingly, the preferred catalysts include the following components:

|                     | Percent by wt. |
|---------------------|----------------|
| Silica              | 50–95          |
| Alumina             | 50– 5          |
| Modifier or modifers | 0–10          |

A particularly preferred catalyst contains from 7% to 25% by weight of alumina, the remainder being silica, with an optional proportion of modifier up to 10% by weight.

While the catalysts according to this invention may be catalytically active forms of natural alumina-silica minerals, for example kaolin or china clays, with or without modifiers, or may be mixtures of silica and alumina impregnated with modifiers if desired, it is preferred to use as catalyst a synthetic silica-alumina material such as those commercially available as cracking catalysts; such a catalyst may, like the others mentioned, be impregnated with a desired modifier by steeping the material in a solution of a compound of the metal, and drying the steeped material. The steeped composition may then be treated in any of several ways in order to produce the catalyst. Some of the metal compounds may remain unchanged in the catalyst as eventually produced, while others may be converted to other compounds of the metals or to the metals themselves.

The modifier may be added to the silica-alumina by a variety of techniques well known to those experienced in the art. These methods include the steeping of the silica-alumina in salt solutions, precipitation of compositions within the silica-alumina shapes, deposition of materials by evaporation of salt solutions. The products so prepared may be subjected to several procedures prior to use, e.g.

washing, drying and heating to decompose thermally unstable compounds.

The results are given in Table 1. In each case the molar ratio of propionaldehyde to crotonaldehyde was 1:1.

TABLE 1

| Example | Reaction time (hours) | Catalyst | Molar ratio of ammonia to total aldehydes | Space velocity (reciprocal hours) | Molar conversion to 3:4-lutidine on either aldehyde |
|---|---|---|---|---|---|
| 1 | 15 | 85% silica, 15% alumina | 2 | 380 | 16.0 |
| 2 | 11.5 | 85% silica, 15% alumina with 3.3% lead fluoride | 2 | 380 | 16.5 |
| 3 | 15 | 85% silica, 15% alumina | 1.1 | 480 | 24.5 |
| 4 | 0-18 | 85% silica, 15% alumina with 3.3% lead fluoride | 1.07 | 485 | 21.0 |
|   | 18-36 |   | 0.99 | 505 | 26.5 |
|   | 36-54 |   | 1.04 | 495 | 26.5 |
|   | 54-72 |   | 1.01 | 500 | 23.0 |
|   | 72-90 |   | 1.19 | 462 | 25.5 |
| 5 | 0-18 | 85% silica 15% alumina | 0.84 | 550 | 24.0 |
|   | 18-36 |   | 0.84 | 540 | 26.0 |
|   | 35-52 |   | 0.66 | 480 | 15.5 |
| 6 | 18 | do | 1.14 | 600 | 24.5 |

The modified catalysts are particularly suitable for use in the process of the present invention, and the catalyst activity is dependent on the metal in association with silica-alumina.

The crotonaldehyde or propionaldehyde reacted in the process may be the dry material or a minor proportion of water may be present. Crotonaldehyde containing 7% by weight of water may, for instance be used. When water is present in one or both of the aldehyde reactants, it may be advantageous to use as catalyst a composition containing one of the modifying metals or metal compounds.

The following examples further illustrate the invention.

Examples 1 to 6

A mixture of propionaldehyde and crotonaldehyde vapors were heated to 400° C. and then mixed with ammonia heated to the same temperature. The reaction mixture was then passed through a catalyst packed in a tube, the wall of which was maintained at 400° C.

The reaction product from the tube was condensed to form an aqueous layer and an oil layer. The layers were separated and the oil layer was fractionally distilled to yield 3,4-lutidine. Any 3,4-lutidine in the aqueous layer was extracted with benzene and added to the oil layer before distillation.

Examples 7 to 19

The procedure of Examples 1 to 6 was carried out with different reaction temperatures and proportions of reactants.

The results are given in Table 2.

TABLE 2

| Example | Reaction time (hours) | Catalyst | Reaction temp. (° C.) | Feed of reactants in moles per hour per 100 ml. of catalyst | | | | Space velocity (reciprocal hours) | Molar conversion to 3:4-lutidine on either aldehyde |
|---|---|---|---|---|---|---|---|---|---|
|   |   |   |   | Crotonaldehyde | Propionaldehyde | Ammonia | Water |   |   |
| 7 | 0-18 | 85% silica, 15% alumina | 400 | 1.28 | 1.28 | 1.9 |   | 1,000 | 22 |
|   | 18-36 |   |   |   |   |   |   |   | 21 |
| 8 | 0-18 | 85% silica, 15% alumina plus 3.3% w./v. lead fluoride | 400 | 1.29 | 1.29 | 1.9 |   | 1,000 | 18.5 |
|   | 18-35 |   | 400 | 1.21 | 1.21 | 1.9 |   | 965 | 21.5 |
| 9 | 0-18 | 85% silica, 15% alumina | 375 | 0.64 | 0.64 | 1.4 | 0.3 | 635 | 21.5 |
| 10 | 0-18 | do | 425 | 0.64 | 0.64 | 1.4 | 0.3 | 635 | 22 |
|   | 18-36 |   |   |   |   |   |   |   | 22 |
| 11 | 0-18 | do | 450 | 0.64 | 0.64 | 1.4 | 0.3 | 635 | 20.5 |
|   | 18-36 |   |   |   |   |   |   |   | 20.5 |
| 12 | 9-18 | do | 400 | 0.58 | 0.72 | 1.4 | 0.3 | 635 | [1] 25.5 |
|   | 18-36 |   |   |   |   |   |   |   | [1] 25.5 |
| 13 | 0-18 | ¼ to ⅛ mesh activated alumina | 400 | 0.65 | 0.65 | 1.4 | 0.3 | 640 | 11.5 |
|   | 18-31½ |   | 400 | 0.64 | 0.64 | 1.4 | 0.3 | 635 | 10.5 |
| 14 | 0-18 | ¼ to ⅛ mesh activated alumina plus 5% w./v. lead oxide | 400 | 0.6 | 0.6 | 1.4 | 0.3 | 630 | 11.5 |
|   | 18-36 |   | 400 | 0.63 | 0.63 | 1.4 | 0.3 | 635 | 10.5 |
| 15 | 0-18 | 85% silica, 15% alumina plus 5% w./v. stannic oxide | 400 | 0.66 | 0.66 | 1.4 | 0.3 | 640 | 26.5 |
|   | 18-38 |   | 400 | 0.63 | 0.63 | 1.4 | 0.3 | 630 | 27 |
| 16 | 0-15 | do | 400 | 0.65 | 0.65 | 1.4 |   | 600 | 24 |
|   | 15-30 |   |   |   |   |   |   |   | 25.5 |
| 17 | 0-15 | 85% silica, 15% alumina plus 2% w./v. stannic oxide | 400 | 0.7 | 0.7 | 1.4 |   | 650 | 26 |
|   | 19-34 |   | 400 | 0.68 | 0.68 | 1.4 |   | 620 | 25.5 |
| 18 | 0-15 | 85% silica, 15% alumina plus 5% w./v. zinc oxide | 400 | 0.66 | 0.66 | 1.4 |   | 610 | 21.5 |
|   | 15-30 |   |   |   |   |   |   |   | 24 |
| 19 | 0-15 | 85% silica, 15% alumina plus 10% w./v. stannic oxide | 400 | 0.67 | 0.67 | 1.4 |   | 615 | 24.5 |
|   | 15-30 |   |   |   |   |   |   |   | 24.5 |

[1] On croton-aldehyde.

Examples 13 and 14 are comparative examples illustrating the use of an alumina and a modified alumina catalyst respectively. Comparison of these examples with the other examples in the specification clearly shows that silica-alumina is superior to alumina as a catalyst for the production of 3,4-lutidine.

I claim:

1. A process for producing 3,4-lutidine which comprises heating in the vapor phase a mixture of crotonaldehyde, propionaldehyde and ammonia at a temperature of 375° to 450° C. in the presence of a catalyst which is a mixture of 15% by weight of alumina and 85% by weight of silica impregnated with a compound selected from the group consisting of lead oxide, zinc oxide, lead fluoride and stannic oxide.

2. A process for producing 3,4-lutidine which comprises heating in the vapor phase a mixture of crotonaldehyde, propionaldehyde and ammonia at a temperature of 375° to 450° C. in the presence of a catalyst which is a mixture of 15% by weight of alumina and 85% by weight of silica impregnated with zinc oxide.

References Cited

UNITED STATES PATENTS 2,523,580 9/1950 Mahan _____ 260—290
2,698,849 1/1955 Aries _____ 260—290

FOREIGN PATENTS 898,869 6/1962 Great Britain.

OTHER REFERENCES

Tschitschibabin, Jour. für Praktische Chem., vol. [2], 107, pp. 122–8 (1924).

HENRY R. JILES, Primary Examiner

C. M. SHURKO, Assistant Examiner

U.S. Cl. X.R.

252—441, 454, 457, 458, 459, 460